US006183394B1

(12) United States Patent
Minowa et al.

(10) Patent No.: US 6,183,394 B1
(45) Date of Patent: Feb. 6, 2001

(54) CONTROL APPARATUS AND METHOD FOR AN AUTOMATIC TRANSMISSION OF A VEHICLE

(75) Inventors: Toshimichi Minowa, Mito; Tatsuya Ochi, Hitachi, both of (JP)

(73) Assignee: Hitachi, Ltd., Tokyo (JP)

(*) Notice: Under 35 U.S.C. 154(b), the term of this patent shall be extended for 0 days.

(21) Appl. No.: 09/352,120

(22) Filed: Jul. 13, 1999

Related U.S. Application Data

(63) Continuation-in-part of application No. 08/998,735, filed on Dec. 29, 1997.

(30) Foreign Application Priority Data

Dec. 26, 1996 (JP) .................................................. 8-347103

(51) Int. Cl.[7] .................................................. F16H 61/08
(52) U.S. Cl. ........................................... 477/143; 477/102
(58) Field of Search .................................... 477/102, 107, 477/109, 143, 144; 701/51, 55

(56) References Cited

U.S. PATENT DOCUMENTS 4,527,678 * 7/1985 Pierce et al. ....................... 192/3.58
4,671,139 * 6/1987 Downs et al. .................. 477/143 X
4,792,902 * 12/1988 Hrovat et al. .................... 477/102 X
5,036,729 * 8/1991 Nitz et al. ........................ 477/143 X
5,596,495 * 1/1997 Brown et al. .................... 477/144 X
5,954,776 * 9/1999 Saito et al. ...................... 477/118 X

* cited by examiner

*Primary Examiner*—Sherry Estremsky
(74) *Attorney, Agent, or Firm*—Evenson, McKeown, Edwards & Lenahan, P.L.L.C.

(57) ABSTRACT

Control apparatus having improved characteristics at an early stage of changing the gear position which make it possible to clearly discriminate the change in the transmission input shaft revolution speed caused by a rise in the engine torque by depressing the accelerator pedal from changes attending on the disengagement of the disengaging side clutch. For the above purpose, the control apparatus adopts a configuration capable of correcting the oil pressure acting on the friction coupling device by an arrangement that the transmission output shaft revolution ratio, obtained from the transmission output shaft revolution speed and the transmission input shaft revolution speed, follows up the target value of the revolution ratio after a speed change signal is issued.

11 Claims, 6 Drawing Sheets

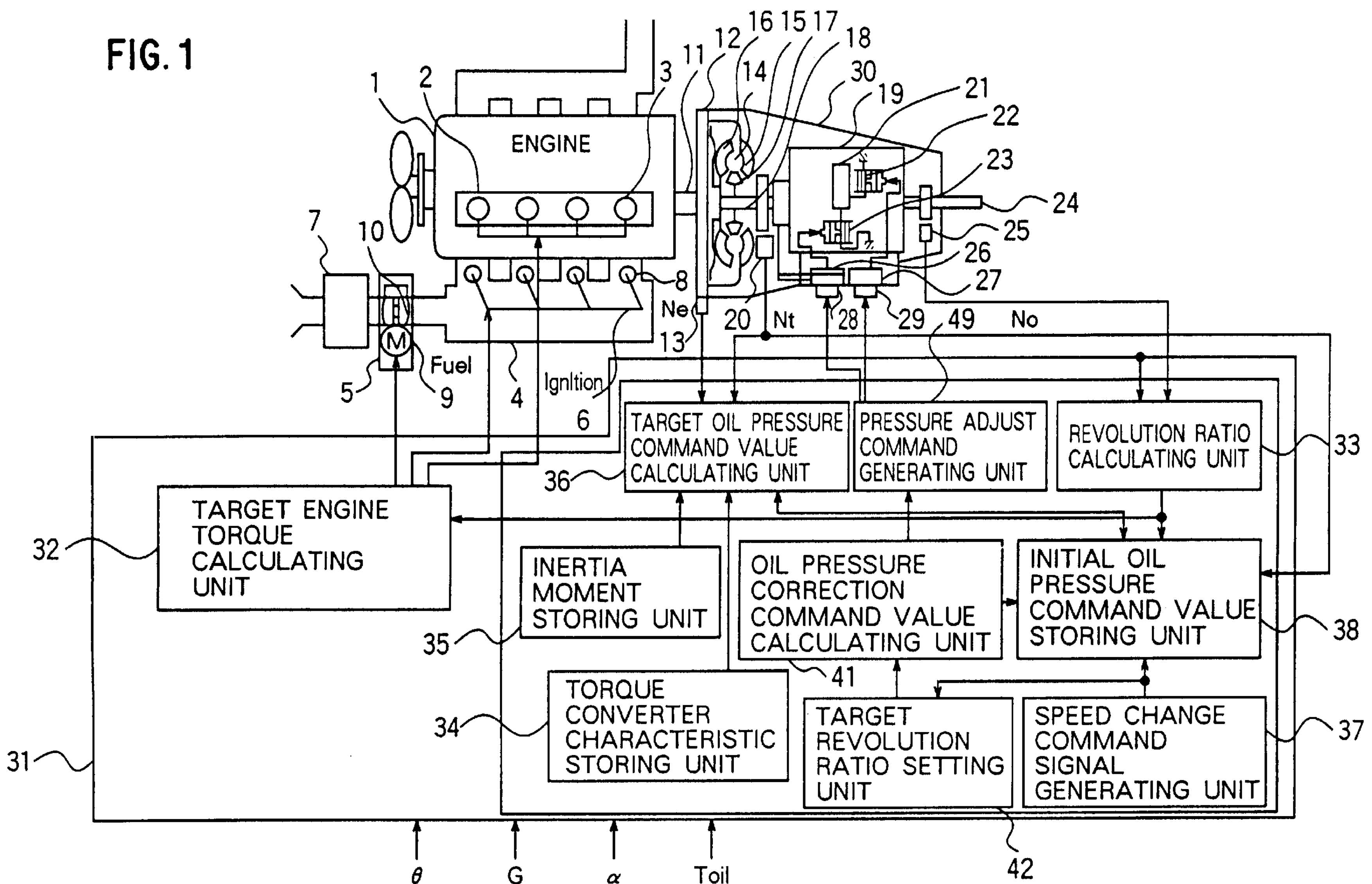
FIG. 1
ENGINE
Fuel
Ignition
Ne
Nt
No
TARGET OIL PRESSURE COMMAND VALUE CALCULATING UNIT
PRESSURE ADJUST COMMAND GENERATING UNIT
REVOLUTION RATIO CALCULATING UNIT
TARGET ENGINE TORQUE CALCULATING UNIT
INERTIA MOMENT STORING UNIT
OIL PRESSURE CORRECTION COMMAND VALUE CALCULATING UNIT
INITIAL OIL PRESSURE COMMAND VALUE STORING UNIT
TORQUE CONVERTER CHARACTERISTIC STORING UNIT
TARGET REVOLUTION RATIO SETTING UNIT
SPEED CHANGE COMMAND SIGNAL GENERATING UNIT
θ
G
α
Toil

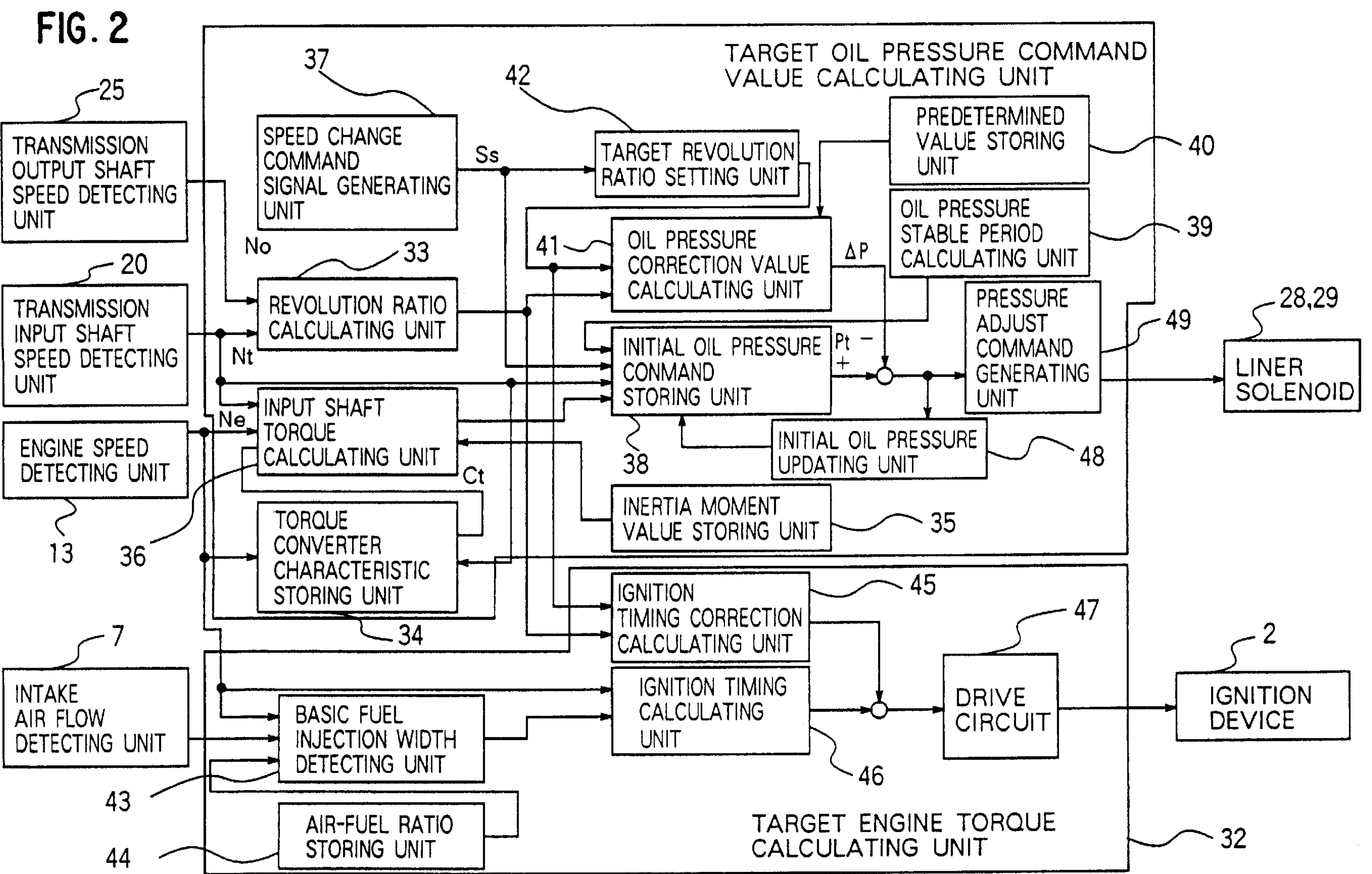
FIG. 2
TRANSMISSION OUTPUT SHAFT SPEED DETECTING UNIT
25
TRANSMISSION INPUT SHAFT SPEED DETECTING UNIT
20
ENGINE SPEED DETECTING UNIT
13
INTAKE AIR FLOW DETECTING UNIT
7
TARGET OIL PRESSURE COMMAND VALUE CALCULATING UNIT
SPEED CHANGE COMMAND SIGNAL GENERATING UNIT
37
Ss
TARGET REVOLUTION RATIO SETTING UNIT
42
PREDETERMINED VALUE STORING UNIT
40
OIL PRESSURE STABLE PERIOD CALCULATING UNIT
39
No
REVOLUTION RATIO CALCULATING UNIT
33
41
OIL PRESSURE CORRECTION VALUE CALCULATING UNIT
ΔP
Nt
INITIAL OIL PRESSURE CONMAND STORING UNIT
Pt
38
PRESSURE ADJUST COMMAND GENERATING UNIT
49
LINER SOLENOID
28,29
Ne
INPUT SHAFT TORQUE CALCULATING UNIT
Ct
36
INITIAL OIL PRESSURE UPDATING UNIT
48
INERTIA MOMENT VALUE STORING UNIT
35
TORQUE CONVERTER CHARACTERISTIC STORING UNIT
34
IGNITION TIMING CORRECTION CALCULATING UNIT
45
DRIVE CIRCUIT
47
IGNITION DEVICE
2
BASIC FUEL INJECTION WIDTH DETECTING UNIT
43
IGNITION TIMING CALCULATING UNIT
46
AIR-FUEL RATIO STORING UNIT
44
TARGET ENGINE TORQUE CALCULATING UNIT
32

CONTROL APPARATUS AND METHOD FOR AN AUTOMATIC TRANSMISSION OF A VEHICLE

CROSS-REFERENCE TO RELATED APPLICATIONS

This application is a continuation-in-part of U.S. application Ser. No. 08/998,735 filed on Dec. 29, 1997.

BACKGROUND OF THE INVENTION

This application claims the priority of Japanese application number 08-347103, the disclosure of which is expressly incorporated by reference herein.

The present invention relates to an apparatus for controlling the oil pressure in an automatic transmission of a vehicle when changing a transmission speed (a gear ratio), and more particularly to a control apparatus and a method for engaging and disengaging a clutch by directly and electrically controlling the oil pressure acting on the clutch (friction coupling device).

An apparatus disclosed in Japanese Patent Application Un-examined laid-open No. JP-A-63-263248 is a widely known example of apparatus for engaging and disengaging the clutch by electrically controlling the clutch operating oil pressure. This Japanese Patent 15 Unexamined Publication described a system in which when controlling the oil pressure acting on the disengaging clutch to change the transmission speed, the revolution speed of the transmission input shaft (turbine revolution speed) is controlled to follow up the preset target value of the revolution speed of the transmission input shaft. This invention proposes a method for performing stable control of the disengaging clutch, realized by feedback control of the operating oil pressure of the disengaging clutch according to the change in the input shaft revolution speed which changes with the engaging state of the engaging clutch.

According to the above-mentioned well-known example, the operating oil pressure of the disengaging clutch is controlled by feedback of the transmission input shaft revolution speed. However, there is a difficulty in discriminating between the change in the input shaft revolution speed caused by an increase of the engine torque due to pressing down on the accelerator pedal, and the change of the input shaft revolution speed attending on the disengagement of the disengaging clutch. This difficulty results in the degradation of the controllability of the operating oil pressure control. Accordingly, a great shock at gear change is inevitable, which arises from a shift in disengaging timing of the disengaging clutch when changing the gears.

SUMMARY OF THE INVENTION

The present invention has as its object to provide a good speed change characteristic by clearly discriminating between the change in the input shaft revolution speed due to the increase of the engine torque, and the change in the input shaft revolution speed attending on the disengagement of the disengaging clutch, and accurately controlling the operating oil pressure of the disengaging clutch.

It is becoming increasingly important to establish a transmission control system which eliminates the one way clutch for the purposes of down-sizing, weight reduction, and improved controllability of the automatic transmission, and directly and electrically controlling the clutch operating oil pressure for engaging and disengaging the clutch. In the above system, it is indispensable to control with high accuracy the clutch operating oil pressure for a period from when a speed change start command signal is issued until the gears are actually changed. In real motor vehicles, however, many man-hours have been spent for matching which is required according to individual differences among the transmissions attributable to mass-production, the wear of the clutch due to secular change, the change of the clutch operating oil pressure accompanying the changes in oil temperature, etc. Therefore, it is essential to detect changes in the clutch operating oil pressure by using some sensor signal, and perform feedback control based on detection results.

However, when the above-mentioned feedback control is executed according to only one piece of data on revolution speed, it is impossible to discriminate between the change in the input shaft revolution speed caused by the rise in the engine torque due to pressing down on the accelerator pedal or the change in the input shaft revolution speed attending on the disengagement of the disengaging clutch. The resulting inadequate controllability of the operating oil pressure control invariably gives rise to a great shock in changing gears.

The above problem is solved by control apparatus as follows. The present invention provides a hydraulic control apparatus of an automatic transmission, which has a pressure-adjust command generating unit for changing a transmission speed by engaging and disengaging a specified friction coupling device in the automatic transmission connected to an engine, and adjusting an oil pressure acting on the friction coupling device and varying a pressure adjusting characteristic when changing the speed, comprising:

- a speed change command signal generating unit for generating speed change command signals representing a speed change ratio;
- a transmission output shaft revolution speed detecting unit for detecting revolution speed of an output shaft of the automatic transmission;
- a transmission input shaft revolution speed detecting unit for detecting revolution speed of an input shaft of the automatic transmission;
- a revolution ratio calculating unit for calculating an output shaft revolution ratio of the transmission by using two revolution speeds obtained by the two revolution speed detecting units; and
- a target revolution ratio setting unit for storing or calculating a target value of the revolution ratio, wherein there is further provided an oil pressure correction value calculating unit for correcting an oil pressure acting on the friction coupling device so that an actual revolution ratio, calculated by the revolution ratio calculating unit, follows up the target revolution ratio when a signal is generated by the speed change command signal generating unit.

Preferably, the hydraulic control apparatus of an automatic transmission further comprises an initial oil pressure command value storing unit for setting a target oil pressure command value for a specified period just after a signal is generated by the speed change command signal, wherein an initial oil pressure command value output from the storing unit is calculated by using a transmission input shaft torque and a transmission input shaft revolution speed as parameters.

Preferably, the hydraulic control apparatus of an automatic transmission further comprises a target engine torque calculating unit for controlling the engine torque so that an actual revolution ratio, calculated by the revolution ratio calculating unit, follows up the target revolution ratio when the signal is generated by the speed change command signal generating unit.

Preferably, the hydraulic control apparatus of an automatic transmission further comprises a hydraulic pressure changing (updating) unit for inputting the oil pressure command value, after control has been performed so that an actual revolution ratio calculated by the revolution ratio calculating unit follows up the target revolution ratio, into the initial oil pressure command value storing unit to update the stored value of the initial oil pressure command value storing unit.

BRIEF DESCRIPTION OF THE DRAWINGS

FIG. 1 is a block diagram of an embodiment according to the present invention;

FIG. 2 is a detailed block of the present invention;

DETAILED DESCRIPTION OF THE PREFERRED EMBODIMENT

Figure 3:
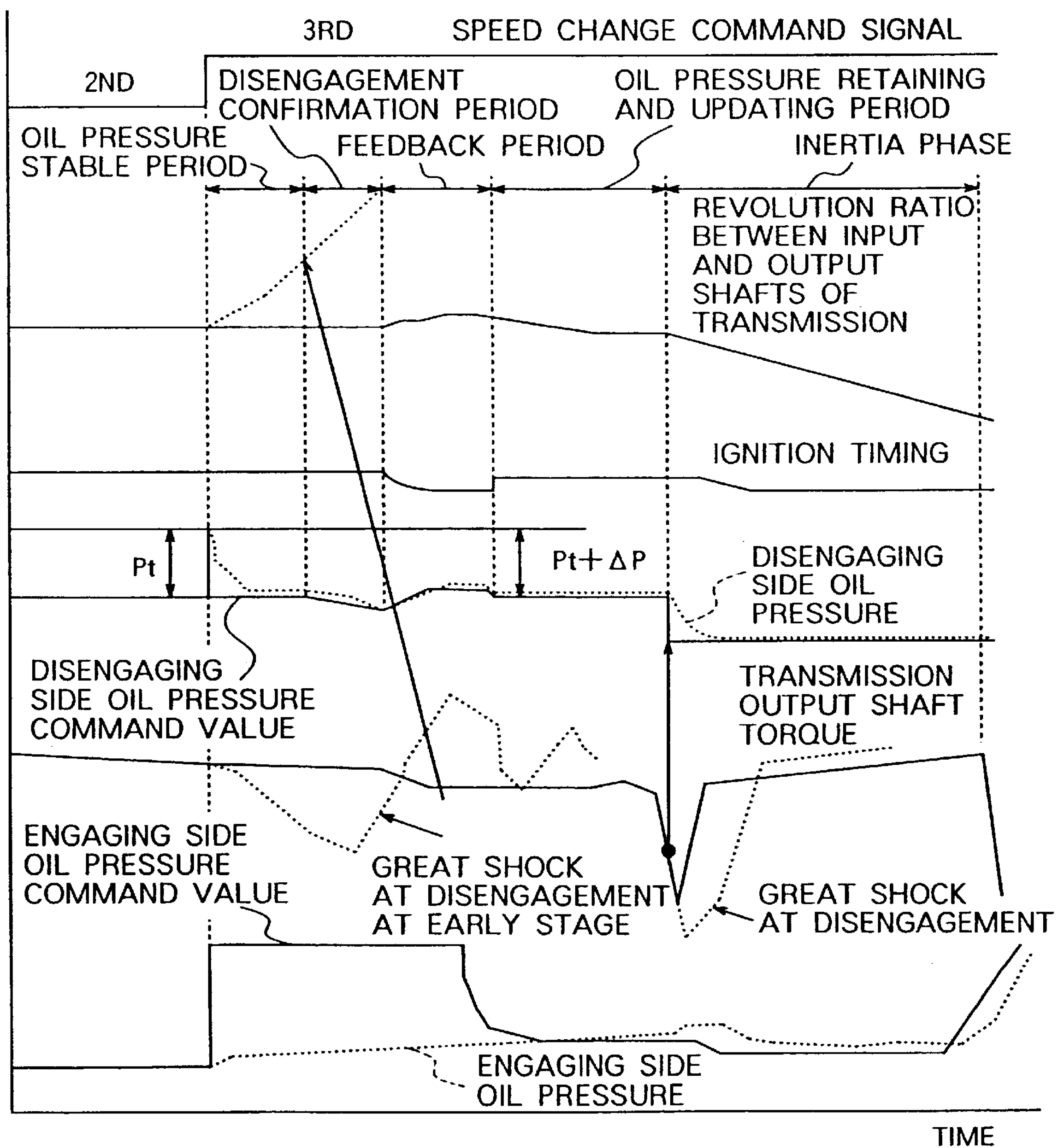
FIG. 3 is a time chart of second-to-third speed change characteristic; [and]

A preferred embodiment of the present invention will be described in detail with reference to the accompanying drawings.

FIG. 1 is a block diagram of an embodiment of the present invention. FIG. 2 is a detailed block diagram of the present invention. In FIG. 1, an engine 1 is a 4-cylinder engine in this embodiment. An ignition device 2 is mounted in the engine 1. The ignition device 2 includes four ignition plugs corresponding to the four cylinders of the engine 1. An intake pipe 4 for drawing air into the engine 1 includes an electronic controlled throttle 5 to adjust the flow rate of air passing through the intake pipe 4, a fuel injection system 6, and an intake air quantity detecting unit such as an air flow meter 7. The fuel injection system 6 includes four fuel injection valves 8 corresponding to the four cylinders in the engine 1. The fuel injection valves 8 may be adapted to directly inject fuel into the cylinders (not shown), in the engine 1. The electronic controlled throttle 5 controls the air flow by driving a throttle valve 10 with an actuator 9. In an ordinary automobile, the throttle valve 10 and an accelerator pedal (not shown) are connected with a mechanical wire (not shown) and operate on a one-to-one basis.

A crankshaft 11 of the engine 1 has a flywheel 12 attached thereto. The flywheel 12 has attached thereto an engine revolution speed detecting unit 13 to detect the revolution speed of the crankshaft 11, in other words, the number of engine revolutions Ne. The torque converter 14 includes a pump 15, a turbine 16, and a stator 17. The output shaft of the turbine 16, that is, the transmission input shaft 18 is directly connected to a multistage transmission 19. Description here will be made of a so-called clutch to clutch type multistage transmission 19 which changes the gear position by engaging and disengaging two friction coupling devices 22, 23, which is taken as an example. The transmission input shaft 18 is fitted with a transmission input shaft revolution speed detector 20 for measuring the number of input shaft revolutions (the number of turbine revolutions) Nt of the transmission. The multistage transmission 19 is composed of planetary gears 21, and friction coupling devices 22, 23, and changes the gear position by changing the gear ratio of the planetary gear 21 by engaging and disengaging the friction coupling devices 22, 23. Those friction coupling devices 22, 23 are controlled respectively by corresponding spool valves 26, 27 and linear solenoids 28, 29 (pressure governors). The multistage transmission 19 is connected to an output shaft 24, and provided with a transmission output shaft revolution speed detector 25 for detecting the revolution speed of the output shaft 24. All those component parts constitute an automatic transmission 30.

The actuators to drive the engine 1 and the automatic transmission 30, which have been described, are controlled by a controller 31. The items of data input to the controller 31 are the throttle angle θ, transmission input shaft revolution speed Nt, engine revolution speed Ne, transmission output shaft revolution speed No, transmission oil temperature Toil~ accelerator pedal depressed amount α, acceleration sensor signal G, etc. The target engine torque calculating unit 32 in the controller 31 outputs control signals to an electronic controlled throttle 5, a fuel injection system 6, and an ignition device 2.

The controller 31 can be realized by a computer. In that case, the controller 31 includes a CPU, a ROM storing a control program, a RAM storing data for arithmetic operations or the like, and an interface I/O for controlling input and output of signals. A control program in which the hydraulic control process according the present invention is stored in a recording medium in a coded form readable to the computer. Typically, this kind of program is stored in the ROM in the controller 31. The program may be stored in a recording medium external to the controller 31, such as a semiconductor memory, a magnetic disk, an optical disk or an IC card so that the controller 31 can read from an external recording medium through a communication circuit when necessary.

Figure 4:
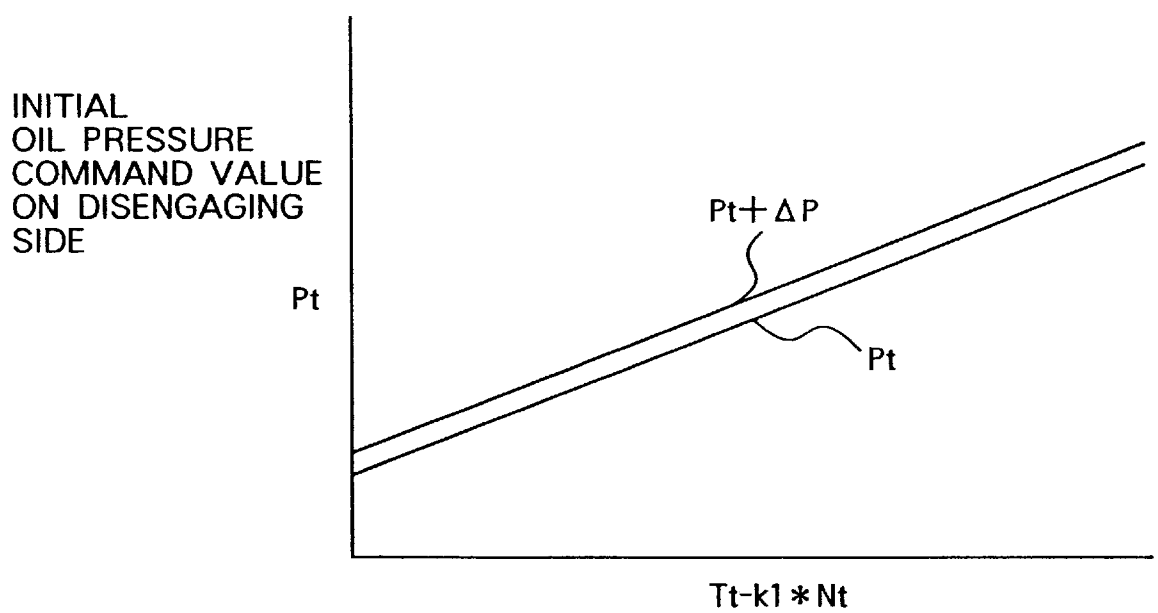
FIG. 4 is a characteristic diagram of the disengaging oil pressure command value.

Next, the contents of the control block diagram written in FIGS. 1 and 2 will be described with reference to FIGS. 3 and 4. FIG. 3 is a time chart of the second-to-third speed change characteristic. FIG. 4 is a characteristic diagram of the disengaging side initial oil pressure command value. Description here will be made of the control method of the oil pressure acting on the disengaging clutch.

In the controller 31, the input shaft revolution speed Nt and the output shaft revolution speed No are input to the revolution ratio calculating unit 33, and the revolution ratio gr, in other words, what is called the gear ratio of the multistage transmission 19 is calculated. The input shaft revolution speed Nt, the engine revolution speed Ne, the torque converter characteristic stored in the torque converter characteristic memory 34, and the engine side inertia moment value stored in the inertia moment storing unit 35 of the controller 31 are input in the input shaft torque calculating unit 36, and the input shaft torque Tt of the multistage transmission 19 is calculated. Generally, this input shaft torque is obtained by equation (1).

$$Tt=t(Nt/Ne)*\{c(Nt/Ne)*Ne-I*dNe/dt\} \quad (1)$$

where t: torque converter torque ratio (function of Nt/Ne)

c: torque converter pump capacity coefficient (function of Nt/Ne)

I: inertia moment of engine

The above-mentioned input shaft revolution speed Nt, the revolution ratio gr, the input shaft torque Tt, and a command signal Ss from a speed change command signal generating unit 37 are input to an initial oil pressure command value storing unit 38 to calculate a target oil pressure command value Pt. This Pt is obtained from a table of the disengaging side initial oil pressure command values shown in FIG. 4. Or, Pt can be obtained by using functional equations (2) and (3).

$$It*dNt/dt+Cd*Nt=Tt-Tc \quad (2)$$

$$Tc=\mu*R*N*(A*Pt-F) \quad (3)$$

where

It: engine, torque converter inertia moment

Cd: viscosity resistance coefficient

Tc: clutch torque $\mu$: clutch friction coefficient

R: clutch effective radius

N: number of clutch plates

A: clutch piston pressure receiving area

F: clutch reaction force

From the above two equations, the inertia term is removed because the input shaft revolution speed Nt hardly varies, and the target oil pressure command value Pt before changing the gear position can be expressed as a function of Tt−k*Nt on the horizontal axis in FIG. 4. Therefore, by obtaining the transmission characteristics (It, Cd, etc.) from the above two equations and storing them in advance, Pt can be found. This indicates how the oil pressure stable period in FIG. 3 is controlled. An oil pressure stable period calculating unit 39 in FIG. 2 outputs a fixed timer value to the initial oil pressure command value storing unit 38, and for a period of the above-mentioned timer value, Pt is calculated in accordance with the functional equation in FIG. 4. In other words, the disengaging side oil pressure command value of the stable period is the initial oil pressure command value. Accordingly, even if the accelerator pedal is depressed during a period of the above-mentioned stable period, the acting oil pressure is controlled according to Tt and Nt, so that a torque characteristic by the stable oil pressure acting on the clutch can be obtained.

Next, description will be made of a method of dealing with individual differences of the transmissions which occur when they are mass-produced. This method concerns the period from the disengagement confirmation period to the oil pressure retaining and updating period. The above-mentioned initial oil pressure command value is a characteristic which is obtained for one specific transmission, so that the speed change characteristic is not applicable to transmissions with variations in oil pressure which are variations occurring during their manufacture. For example, when the actual oil pressure falls below the initial oil pressure command value as shown in FIG. 3, the disengaging side clutch is disengaged at an early stage, with the result that the gear position is shifted to first gear and a great shock of a torque drop occurs (broken line) which attends on the increase in engine side revolution speed. When the actual oil pressure is higher than the initial oil pressure command value, a delay in clutch disengagement occurs, which accompanies an actual delay in oil pressure change, with respect to the occurrence of a release command (at the time of the black dot in FIG. 3) of the disengaging side oil pressure, and a shock of the torque decrease (broken line) occurs at an early stage of the inertia phase which leads to fourth gear position. Therefore, it is necessary to determine the oil pressure just before the disengaging clutch by using some signal at an initial run after the vehicle was produced.

The disengagement period is the period during which the clutch is disengaged intentionally. To this end, a specified value stored in specified value storing unit shown in FIG. 2 is input to oil pressure correction command value calculating means drawn in FIGS. 1 and 2, and a correction value of the target oil pressure command value obtained by the initial oil pressure command value storing means 38 is calculated. In this period, the above-mentioned target oil pressure command value is decreased gradually to allow the disengaging side clutch to be disengaged.

However, if the specified value is too large, the clutch is disengaged abruptly, thus exercising adverse effects on feedback control, which will be described later. Therefore, it is necessary to obtain by matching a predetermined value which requires time as short as possible for clutch disengagement and causes less torque fluctuation in starting the feedback control, and store the predetermined value in the predetermined value storing unit 40. Then, in the feedback period, when a deviation occurs in the actual revolution ratio obtained by the revolution ratio calculating unit 33 from the target revolution ratio of the multistage transmission 19 stored in the target revolution ratio setting unit 42 shown in FIGS. 1 and 2, feedback control of the clutch operating oil pressure is started.

The target revolution ratio is selected for each kind of gear changes obtained by the speed change command signal generating unit 37, and set in the period when the speed change command signal is generated, and input into the oil pressure correction command value calculating unit 41. When the above-mentioned deviation in the feedback control becomes zero or a predetermined value, the feedback control is finished, and the target oil pressure command value at this time is stored in a rewritable memory.

In an automatic transmission in which there is a worry about a delay in oil pressure response, to prevent torque fluctuation caused by the response delay, it is required to additionally implement ignition timing feedback control with high torque control response. A detailed circuit arrangement about this is shown in the target engine torque calculating unit 32 in FIG. 2. Since ignition timing control has been used widely, description of the process from the basic fuel injection width (time) calculating unit 43 to the drive circuit 47 is omitted. However, when ignition timing retarded control is performed in a so-called lean burn engine operated in lean air-fuel ratios, a misfire will occurs, and it is difficult to suppress the above-mentioned torque fluctuation, so that it is required to make a fail-safe arrangement which perform fuel quantity control (air-fuel control) or air quantity control.

Then, in the oil pressure retaining and updating period shown in FIG. 3, the target oil pressure command value stored in the memory when the feedback period is finished is retained. This value is the oil pressure command value just before the disengaging clutch is disengaged. According to this value, the initial oil pressure command value of he initial oil pressure command value storing unit 38 is updated by an initial oil pressure updating unit 48 shown in FIG. 2. In this case, an oil pressure correction command value obtained by the oil pressure correction command value calculating unit 41 may be stored in the memory, and only the oil pressure correction command value in the memory may be updated.

Thereafter, the moment marked by a black dot in FIG. 3, at which the transmission output shaft torque falls, in other words, the engagement starting time of the engaging clutch is recognized, and the target oil pressure command value of the disengaging clutch is decreased in steps to enable the disengaging clutch to be disengaged.

The target oil pressure command value described above is input into oil pressure adjust command generating unit 49 shown in FIGS. 1 and 2, and converted into signals to drive the linear solenoids 28, 29, and those signals are output.

As has been described, according to the present invention, the transmission control apparatus, which directly and electrically controls the clutch operating oil pressure to engage and disengage the clutch, can set the initial operating oil pressure of the disengaging clutch at close to a level just before the clutch is disengaged even when the engine torque rises by pressing down on the accelerator pedal, and therefore offers an excellent speed change characteristic at an early stage of changing the gear position.

Figure 5:
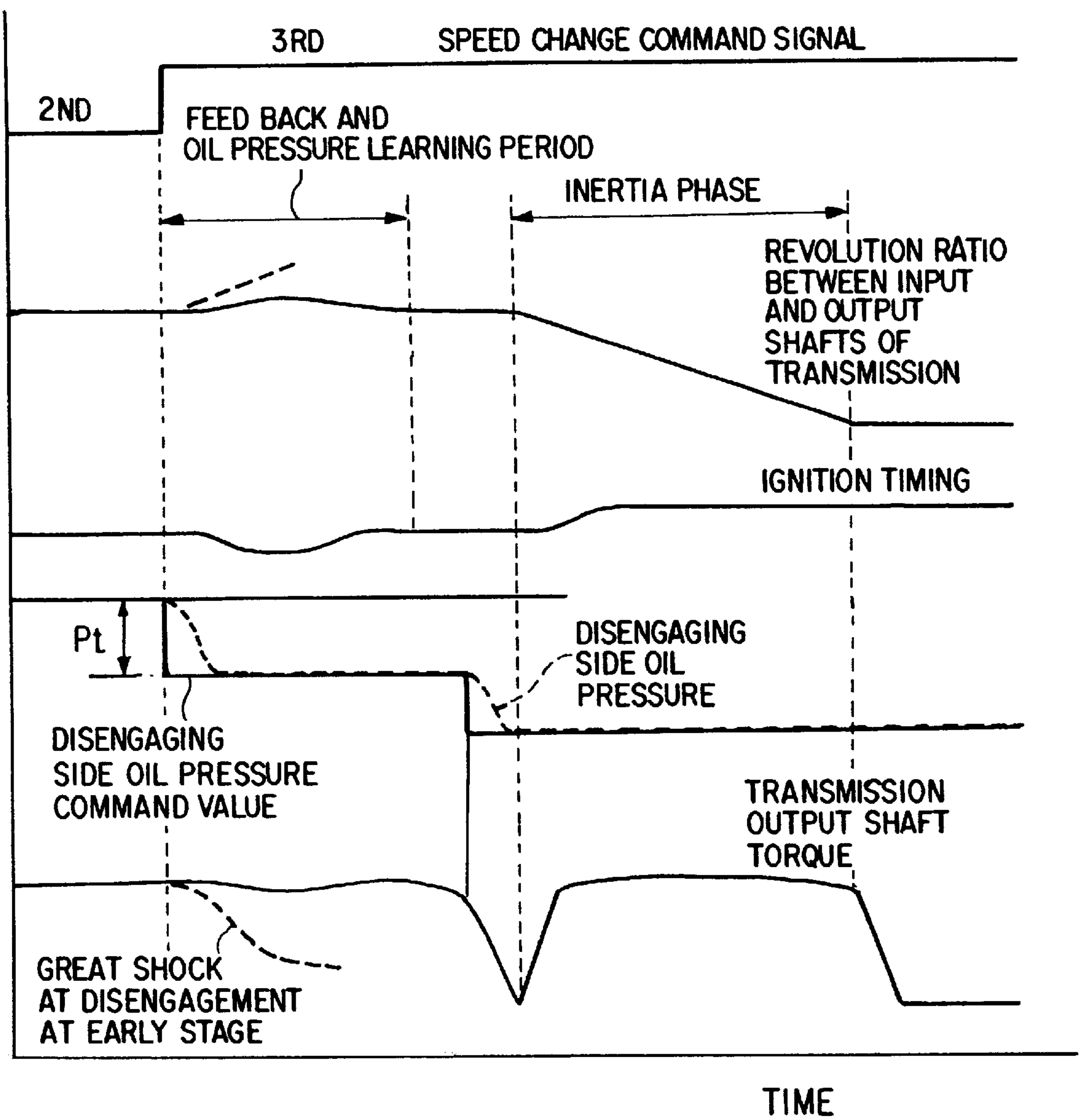
FIG. 5 is a time chart illustrating how control of the engine and transmission suppresses fluctuation of the driving torque.

FIG. 5 is an example in which the disengagement of the clutch occurs early due to production dispersion as compared with a normal disengaging timing. At the same time of changing the shift command signal (speed change command signal), the initial oil pressure command is set at a predetermined certain value previously stored in a memory. That is, the oil pressure is maintained at a critical minimum pressure value which does not cause disengagement of the clutch. However, the clutches in mass production have friction coefficients slightly different each other.

When a clutch has a friction coefficient which is too small to maintain the engagement of the clutch by a predetermined oil pressure, the disengaging side clutch will be undesirably disengaged, and the revolution ratio between the input and output shafts of the transmission will increase. This causes an increase in engine speed and a change in torque corresponding to the inertia of engine. Such changes of engine speed and torque create driver discomfort and cause a break in the clutch.

According to an embodiment of the present invention, after the shift command signal is generated, the ignition timing control is implemented based on a feed-back control with a parameter of the detected revolution ratio between the input and output shafts of the transmission so as to suppress the torque fluctuation. That is, the actual revolution ratio is detected, and the engine torque (same as the input torque of the transmission) is controlled by controlling the ignition timing to maintain the revolution ratio in a target value by the feed-back control system. The ignition timing control is preferable as a torque control measure in view of the response speed in the control system. The present invention is not, however, limited to ignition timing control. A clutch oil pressure control, an intake air flow control or a fuel supply control (including a fuel cut control in cylinders) may be used in place of the ignition timing control. All of these control measures direct control of the output shaft torque at the transmission. One or more control measures are taken in accordance with the several requirements from a control response speed and an exhaust emission control. Any of these control measures can be implemented by the revolution ratio calculating unit 33, the target revolution ratio setting unit 42 and the ignition timing correction calculating unit 45 shown in FIG. 2.

Figure 6:
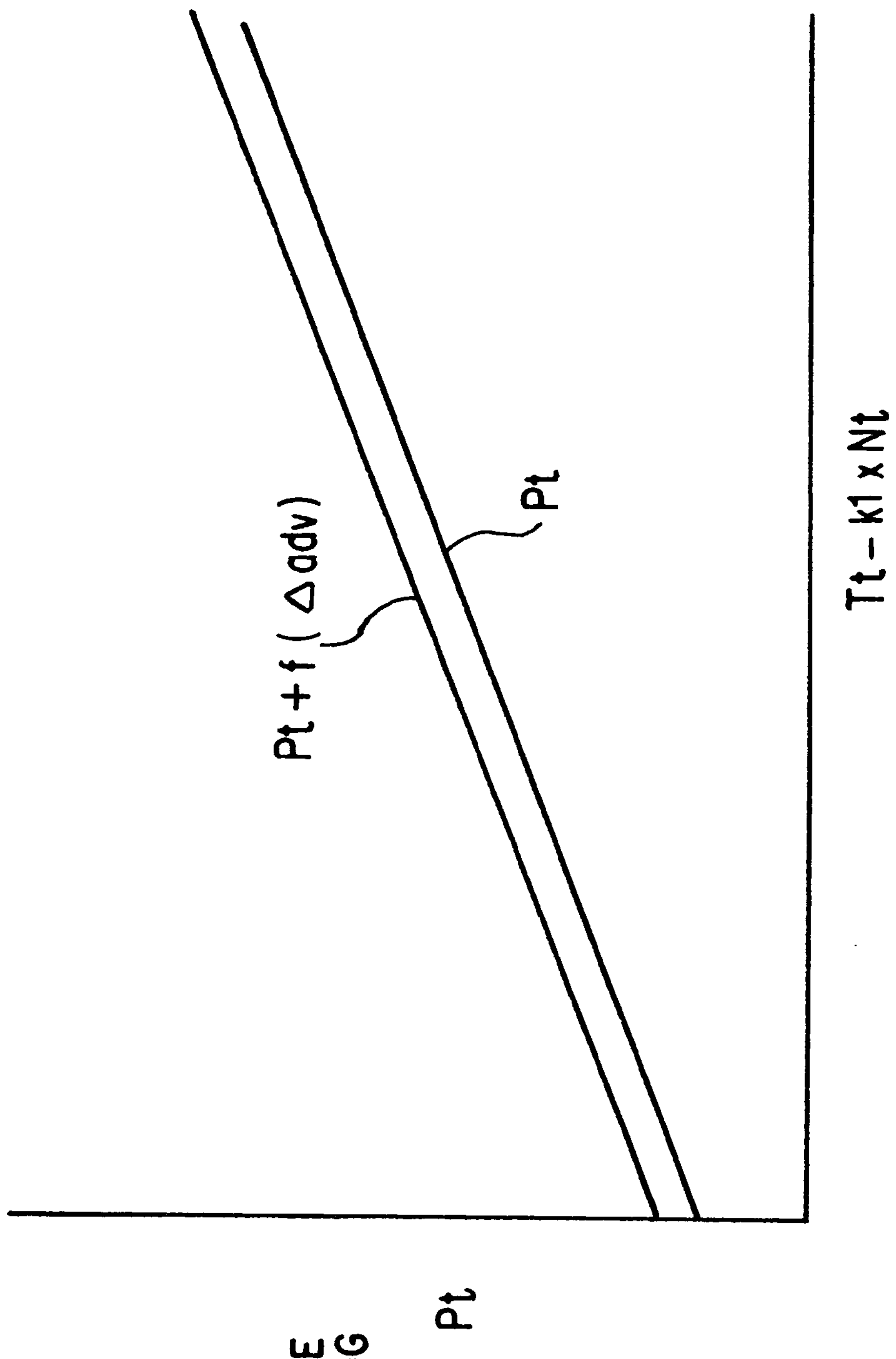
FIG. 6 is a characteristic diagram similar to FIG. 4 for explaining an oil pressure learning control.

FIG. 6 is a characteristic diagram of the disengaging oil pressure command values. The following is an explanation of how to implement the learning control of the initial oil pressure command value on disengaging side clutch by using the ignition timing control shown in FIG. 5.

When a clutch has a friction coefficient large different from an average clutch, the revolution ratio change may increase. Accordingly, the control value of the ignition timing will also be increased. Then, the oil pressure command value can be corrected by using the correction value of the ignition timing. When the ignition timing control is carried out, the initial oil pressure command value Pt is added with the correction oil pressure value f ($\Delta$adv) which is a function of the ignition timing value, so that the corrected oil pressure value Pt+f($\Delta$adv) can be obtained.

That is, the actual revolution ratio becomes the target revolution ratio or within a predetermined range close to the target value, the feed-back control is finished, and the target oil pressure command value stored in the memory is replaced by new command value Pt+f($\Delta$adv) at that time. A target oil pressure command value in the memory is used at next operation. The command value in the memory is updated by the learning control. This learning control of the command oil pressure may be implemented by the ignition timing correction calculating unit 45, the initial oil pressure updating unit 48 and the initial oil pressure command storage unit 38 shown in FIG. 2.

According to the above mentioned embodiment, the torque fluctuation due to the variation of friction coefficients of clutches in mass production can be suppressed, and a proper initial oil pressure command value can be set for the disengaging side clutch, so that a good transmission operation of an automatic transmission without an one-way clutch.

What is claimed is:

1. A hydraulic control apparatus of an automatic transmission having pressure-adjust command generating means for changing a transmission speed by engaging and disengaging a specified friction coupling device in said automatic transmission connected to an engine, and adjusting an oil pressure acting on said friction coupling device when changing the transmission speed, comprising:

speed change command signal generating means for generating a speed change command signal representing a speed change ratio of the automatic transmission;

transmission output shaft revolution speed detector means for detecting a revolution speed of an output shaft of said automatic transmission;

transmission input shaft revolution speed detector for detecting a revolution speed of an input shaft of said automatic transmission;

revolution ratio calculating means for calculating an actual revolution ratio between said input and output shafts of said automatic transmission based on the detected revolution speeds of the input and output shafts;

target revolution ratio setting means for one of storing and calculating a target revolution ratio between said input and output shafts, and oil pressure correction value calculating means for correcting an oil pressure acting on said friction coupling device so that said actual revolution ratio calculated by said revolution ratio calculating means follows up said target revolution ratio after the speed change command signal is generated and before actual shifting starts in response to said speed change command signal.

2. A hydraulic control apparatus of an automatic transmission according to claim 1, further comprising initial oil pressure command value storing means for setting a target oil pressure command value for a specified period just after a speed change command signal is generated by said speed change command signal.

3. A hydraulic control apparatus of an automatic transmission having pressure-adjust command generating means for changing a transmission speed by engaging and disengaging a specified friction coupling device in said automatic transmission connected to an engine, and adjusting an oil pressure acting on said friction coupling device when changing the transmission speed, comprising:

speed change command signal generating means for generating a speed change command signal representing a speed chance ratio;

transmission output shaft revolution speed detector means for detecting a revolution speed of an output shaft of said automatic transmission;

transmission input shaft revolution speed detector for detecting a revolution speed of an input shaft of said automatic transmission;

revolution ratio calculating means for calculating an output shaft revolution ratio of said transmission by using two revolution speeds obtained by said two revolution speed detectors;

target revolution ratio setting means for one of storing and calculating a target value of said revolution ratio, and oil pressure correction value calculating means for correcting an oil pressure acting on said friction coupling device so that an actual revolution ratio calculated by said revolution ratio calculating means follows up said target revolution ratio after a speed change command signal is generated by said speed change command signal generating means further comprising initial oil pressure command value storing means for setting a target oil pressure command value for a specified period lust after a speed change command signal is generated by said speed chance command signal, wherein an initial oil pressure command value output from said storing means is calculated by using a transmission input shaft torque and a transmission input shaft revolution speed as parameters.

4. A hydraulic control apparatus of an automatic transmission having pressure-adjust command generating means for changing a transmission speed by engaging and disengaging a specified friction coupling device in said automatic transmission connected to an engine, and adjusting an oil pressure acting on said friction coupling device when changing the transmission speed, comprising:

speed change command signal generating means for generating a speed change command signal representing a speed change ratio;

transmission output shaft revolution speed detector means for detecting a revolution speed of an output shaft of said automatic transmission;

transmission input shaft revolution speed detector for detecting a revolution speed of an input shaft of said automatic transmission;

revolution ratio calculating means for calculating an output shaft revolution ratio of said transmission by using two revolution speeds obtained by said two revolution speed detectors;

target revolution ratio setting means for one of storing and calculating a target value of said revolution ratio, and oil pressure correction value calculating means for correcting an oil pressure acting on said friction coupling device so that an actual revolution ratio calculated by said revolution ratio calculating means follows up said target revolution ratio after a speed chance command signal is generated by said speed change command signal generating means, further comprising target engine torque calculating means for controlling the engine torque so that an actual revolution ratio calculated by said revolution ratio calculating means follows up said target revolution ratio after a speed change command signal is generated by said speed change command signal generating means.

5. A hydraulic control apparatus of an automatic transmission having pressure-adjust command generating means for changing a transmission speed by engaging and disengaging a specified friction coupling device in said automatic transmission connected to an engine, and adjusting an oil pressure acting on said friction coupling device when changing the transmission speed, comprising:

speed change command signal generating means for generating a speed change command signal representing a speed chance ratio;

transmission output shaft revolution speed detector means for detecting a revolution speed of an output shaft of said automatic transmission;

transmission input shaft revolution speed detector for detecting a revolution speed of an input shaft of said automatic transmission;

revolution ratio calculating means for calculating an output shaft revolution ratio of said transmission by using two revolution speeds obtained by said two revolution speed detectors;

target revolution ratio setting means for one of storing and calculating a target value of said revolution ratio, and oil pressure correction value calculating means for correcting an oil pressure acting on said friction coupling device so that an actual revolution ratio calculated by said revolution ratio calculating means follows up said target revolution ratio after a speed change command signal is generated by said speed change command signal generating means further comprising initial oil pressure command value storing means for setting a target oil pressure command value for a specified period lust after a speed change command signal is generated by said speed change command signal, further comprising hydraulic pressure changing means for inputting said oil pressure command value, after control has been performed so that an actual revolution ratio calculated by said revolution ratio calculating means follows up said target revolution ratio, into said initial oil pressure command value storing means to update the stored value of said initial oil pressure command value storing means.

6. A hydraulic pressure control method of an automatic transmission of changing a transmission speed by engaging and disengaging a specified friction coupling device in which an oil pressure acting on said friction coupling device is adjusted when changing the transmission speed, generating a speed change signal representing a gear ratio of said automatic transmission;

detecting a revolution speed of a transmission output shaft;

detecting a revolution speed of a transmission input shaft;

calculating an actual revolution ratio of said transmission between said input and output shafts of said automatic transmission based on the detected revolution speeds of the input and output shafts;

one of storing and calculating a target value of said revolution ratio between said input and output shafts of said automatic transmission; and correcting the oil pressure acting on said friction coupling device so that said output shaft revolution ratio follows up said target value of said revolution ratio after the speed change command signal is generated and before actual shifting starts in response to said speed change command signal.

7. A hydraulic pressure control method according to claim 6, wherein said oil pressure is controlled according to an oil pressure command value stored in a memory for a specified period after said speed change signal.

8. A hydraulic control apparatus of an automatic transmission having pressure-adjust command generating means for changing the transmission speed by engaging and disengaging a specified friction coupling device in said automatic transmission connected to an engine, and adjusting an oil pressure acting on said friction coupling device when changing the transmission speed, comprising;

speed change command signal generating means for generating a speed change command signal representing a speed change ratio of said automatic transmission;

transmission output shaft revolution speed detector for detecting a revolution speed of an output shaft of said automatic transmission;

transmission input shaft revolution speed detector for detecting a revolution speed of an input shaft of said automatic transmission;

revolution ratio calculating means for calculating an actual revolution ratio of said automatic transmission based on said transmission output shaft revolution speed and said transmission input shaft revolution speed;

target revolution ratio setting means for one of storing and calculating a target revolution ratio between said input and output shafts; and output shaft torque control means for controlling an output shaft torque of said automatic transmission, wherein said output shaft torque control means controls said output shaft torque so that said revolution ratio follows said target revolution ratio after the speed change command signal is generated and before actual shifting starts in response to said speed chance command signal.

9. A hydraulic control apparatus of an automatic transmission according to claim 8, further comprising initial oil pressure command value storing means for setting at least target oil pressure command value for a specified period after said speed change command signal is generated.

10. A hydraulic control apparatus of an automatic transmission according to claim 8, wherein said output shaft torque control means controls at least an ignition timing of said engine.

11. A hydraulic control apparatus of an automatic transmission having pressure-adjust command generating means for changing the transmission speed by engaging and disengaging a specified friction coupling device in said automatic transmission connected to an engine, and adjusting an oil pressure acting on said friction coupling device when changing the transmission speed, comprising;

speed change command signal generating means for generating a speed change command signal representing a speed change ratio of said automatic transmission;

transmission output shaft revolution speed detector for detecting a revolution speed of an output shaft of said automatic transmission;

transmission input shaft revolution speed detector for detecting a revolution speed of an input shaft of said automatic transmission;

revolution ratio calculating means for calculating an output shaft revolution ratio of said automatic transmission according to said transmission output shaft revolution speed and said transmission input shaft revolution speed;

target revolution ratio setting means for one of storing and calculating a target value of said revolution ratio; and output shaft torque control means for controlling an output shaft torque of said automatic transmission, wherein said output shaft torque control means controls said output shaft torque so that said revolution ratio follows said target revolution ratio, further comprising initial oil pressure command value storing means for setting at least target oil pressure command value for a specified period after said speed change command signal is generated, wherein an oil pressure command stored in said initial oil pressure command value storing means is changed in accordance with a control amount for controlling said output shaft torque such that said revolution ratio follows said target revolution ratio.

* * * * *